H. J. MURRAY AND W. S. RUGG.
SINGLE MOTOR BOLSTER.
APPLICATION FILED MAY 27, 1918.
1,386,588.
Patented Aug. 2, 1921.
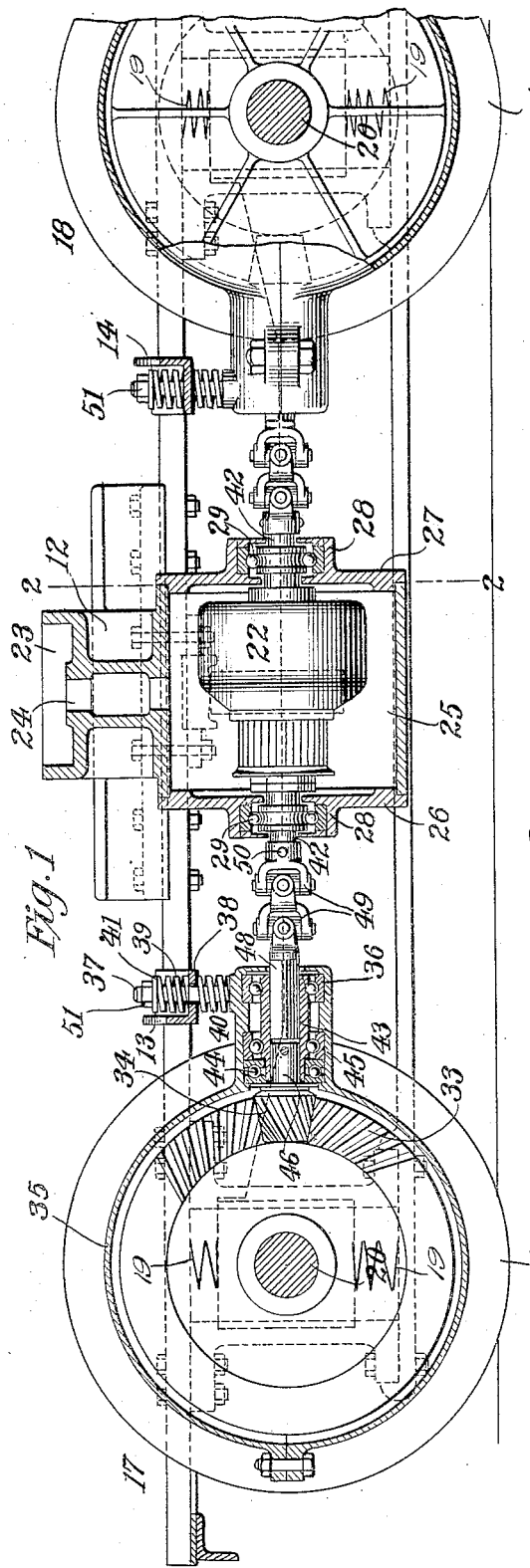
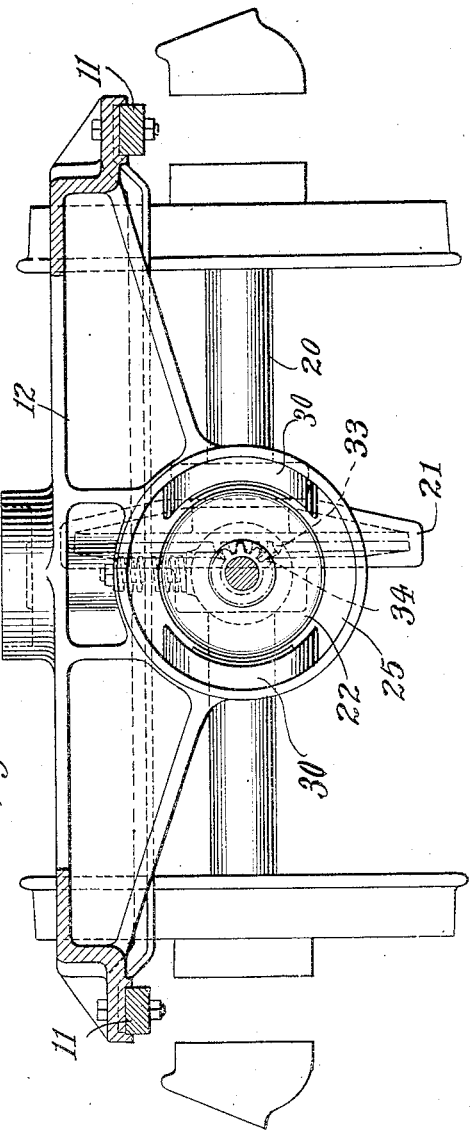
INVENTOR
Howard J. Murray
Walter S. Rugg
BY
Messimer and Austin
ATTORNEY

UNITED STATES PATENT OFFICE.

HOWARD J. MURRAY, OF BROOKLYN, NEW YORK, AND WALTER S. RUGG, OF PITTSBURGH, PENNSYLVANIA.

SINGLE-MOTOR BOLSTER.

1,386,588.     Specification of Letters Patent.     Patented Aug. 2, 1921.

Application filed May 27, 1918. Serial No. 236,855.

*To all whom it may concern:*

Be it known that we, HOWARD J. MURRAY, a citizen of the United States, and a resident of Brooklyn, county of Kings, and State of New York, and WALTER S. RUGG, a citizen of the United States, and a resident of Pittsburgh, county of Allegheny, and State of Pennsylvania, have invented certain new and useful Improvements in Single-Motor Bolsters, of which the following is a specification.

The invention relates in general to a wheel truck construction constituting an element of a power system for use in electrically driven vehicles and particularly relates to a wheel truck construction of the type in which the motor and its driving connection with the axle of the vehicle running gears are resiliently supported.

This application includes the feature of mounting a motor resiliently from some cushioned element of the motor truck, as disclosed in our application entitled Car motor mountings, Serial No. 236,853, filed under even date, and also contains a construction in which the casing of the motor is formed as an integral part of some structural part of a resilient supported truck element, which construction is featured broadly in our co-pending application Serial No. 236,854, entitled Motor casing truck construction, filed under even date.

The invention herein disclosed contemplates a construction having the advantages of a cushioned single motor and flexible driving connection with a pair of axles together with a single structural element which will incorporate the function of a bolster and a motor casing.

One of the objects of this invention is to provide a simplified construction of the type described in which a light power plant for driving the two axles is compactly assembled in the limited space between the axles in such a way that transmission losses are reduced to a minimum, and in which not only the initial cost of construction, but the maintenance is reduced over known constructions.

This object is attained in general by positioning a cushioned motor, centrally of the wheel truck and coupling the same to the axle at opposite sides thereof by means of a flexible driving transmission associated with a simple form of reducing gear drive with each axle.

Incidental to this general construction, it is a further desideratum to provide a construction which can be utilized not only as an inclosing casing for the gear transmission, but which will also constitute a means for maintaining the gears in their present meshed position without affecting the flexibility between the driving motor and the axles.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawing:

Figure 1 is a vertical and sectional view taken longitudinally through the center of a conventional form of motor truck showing a preferred embodiment of our invention in position thereon and taken on the line 1—1 of Fig. 2; and Fig. 2 is a vertical, transverse sectional view taken on the line 2—2 of Fig. 1.

In the accompanying drawing there is illustrated a truck of the passenger type, comprising a wheel truck element of the two axle type. As part of the car truck frame 10 there is shown side sills 11, connected by a bolster 12. The frame is supported from a wheel truck in which are journaled a pair of running gears 17 and 18, the truck frame is resiliently supported from the wheel truck by sets of springs 19 disposed on opposite sides of the structure and the structural parts otherwise respond to conventional designs. This resilient mounting of the frame causes the bolster casting 12 and these spring supported parts of the wheel truck to act as cushioned means for supporting the motor hereinafter described. The running gears each include an axle 20, provided at opposite ends with flanged wheels 21 all as is usual in one well known form of such constructions.

Both of the axles are driven from a single electric motor 22. This motor is centrally positioned and suspended from the cushioned bolster casting 12. To accommodate this motor the casting is designed differently from conventional structure in that it is formed as a flat V-shaped strut as shown in side elevation in Fig. 2. This casting is provided with the king pin socket 23 which is of conventional form and is provided centrally thereof with a king pin aperture 24 opened into the motor casing so as to accommodate a relatively long king pin (not shown).

The lower portion of the casting is formed into a cylindrical shell 25 designed to constitute a part of the motor shell. In the form illustrated, the shell is opened forwardly and rearwardly at opposite ends, which ends are designed to be closed by means of end closing plates 26 and 27. The central portions of these plates are enlarged to provide bearing housings 28 for accommodating armature shaft supporting bearings 29.

The shell 25 is provided on opposite sides thereof (see Fig. 2) with cores 30 preferably formed therein in the act of casting. By means of a bolster of this configuration it is possible to obtain a relatively large mass of material along the vertical medial line of the truck, so as to take up strain incidental to such constructions and at the same time to utilize this material as a part of the necessary field producing means of an electric motor. As the entire member can be cast integrally the necessary machine work to construct the bolster and motor parts is reduced to a minimum. Positioning the motor centrally of the bolster permits of a straight driving connection longitudinally of the vehicle with opposite axles and at the same time provides a construction which will in no way interfere with the king pin mounting and further tends to contralize strains on the truck.

The armature 31 of the motor is mounted centrally upon an armature shaft 42 which extends longitudinally of the vehicle, has opposing ends projecting beyond opposite ends of the motor and is mounted on the roller bearings 29.

Each end of this floating armature shaft is operatively connected with the adjacent axle to drive the same through a flexible driving power transmission.

As the driving connection at opposite ends of the motor is similar in construction, except for obvious reverses in direction the detailed description of one driving mechanism will suffice for both. This transmission includes a reducing gear train formed of a relatively large gear 33, fixed centrally to the axle 20 and a relatively small pinion 34 constantly meshing therewith. In order to obtain the greatest possible ratio of gear reduction the gear 33 is made of the greatest diameter possible to be mounted on the axle and at the same time to give the required clearance above the track to the gear and its casing. The gear 33 is inclosed within a light metal casing 35, supported from the axle and loosely mounted upon the hub of the gear 33. The casing is provided with a tubular extension 36 projecting toward the motor and resiliently held in position against rotation by a connection with either supporting bar 13 or 14 positioned directly above the same. This connection includes a pin 37 passed through an opening 38 in a flange of the bar which pin is provided with a coiled spring 39 positioned between the bar and the extension and a second coiled spring 40 positioned between the bar and a washer 41 mounted on the pin above the bar. The washer is adjustably held in position by means of a locked nut 51 so arranged that the rotation of the nut in one or the other direction will increase or decrease the tension on the spring. In this way the casing is held against rotation but has some freedom of movement about the axis of the axle. The extension is provided with a driving sleeve 43 rotatably mounted within end thrust bearings 44 and radial thrust bearings 45. The pinion 34 is mounted in position so as to be continuously in mesh with the gear 33. The pinion is fixed to a short shaft 46. The bore of that part of the sleeve which faces the motor is square in cross-section and has a square shaft 48 slidably mounted therein. The square shaft constitutes part of a compound universal joint 49, the opposite end 50 of which is pinned to the portion of the armature shaft which projects beyond the end plates of the motor.

In operation it will be understood that the truck is free to turn about the axis of the king pin and that the truck as a whole is free to function as is common with such devices now in general use. Normally the driving connections of both transmissions with the motor are horizontally disposed, the extended axis of rotation of the motor passing at right angles through the axis of the axle. Further the axis of the armature shaft when in normal position and with an average load on the vehicle passes through the center of each axle thus insuring the highest possible efficiency of driving connection with the axles.

As the motor is cushioned free to swing vertically, the weight of the motor part is taken off the axle and the material which is necessary to make up some of the motor parts is utilized as a portion of the bolster so as to assist in taking up strains on this member as defined in our co-pending applications. The sliding connection provided by the square shaft permits the motor as a whole to travel toward either axle longitudinally and the compound universal joint permits the motor to swing freely in any transverse direction with little or any effect upon the driving connection between the motor and axle. The driving connection is continuous from axle to axle so that the device acts as a flexible reverse differential, the central portion of which is formed by the armature shaft itself.

Having thus described our invention, we claim:—

1. In a vehicle, the combination with a wheel truck provided with two driven axles, free to move relative to each other, a bolster extending transversely of the vehicle and positioned between the axles, a single motor positioned on the bolster, means for cushioning the motor and flexible driving connections from said motor to both of said axles.

2. In a vehicle, the combination of a wheel truck including two driven axles free to move relative to each other, a structural element resiliently supported from said axles and free to move vertically relative thereto, a single electric motor carried by the resilient structural element having its armature extending in opposite directions therefrom toward the axles and flexible driving connections between each end of the armature and the axle adjacent thereto.

3. In a vehicle, a wheel truck including a king pin casting provided with a king pin socket, and a motor supported by the casting and positioned beneath the king pin socket and means for coupling the motor with the wheels of the truck to drive the same.

4. A wheel truck provided with a pair of wheel driving axles, and a bolster resiliently supported from the axles, an electric motor carried by said bolster and extending into the space between the axles, a longitudinally extending and continuous power transmission extending between and operatively connected to both of said axles to rotate the same, said transmission being flexible to permit relative movement between the axles, and a part of said transmission constituting the armature shaft of said electric motor.

5. A wheel truck provided with a pair of wheel driving axles, and a bolster resiliently supported from the axles, an electric motor carried by said bolster, and extending into the space between the axles, each end of the armature shaft provided with a flexible extension and a geared connection between each of said flexible extensions and the adjacent axle whereby each of said axles is permitted free play relative to the motor while maintaining a positive, driven connection therewith.

6. A wheel truck provided with a pair of wheel driving axles, and a bolster resiliently supported from the axles, an electric motor carried by said bolster, and extending into the space between the axles, each end of the armature shaft provided with a flexible extension, and a geared connection between each of said flexible extensions and the adjacent axle whereby each of said axles is permitted free play relative to the motor while maintaining a positive, driven connection therewith and means for resiliently supporting a part of said gear connection.

7. A wheel truck provided with a wheel driving axle, a bolster resiliently supported from said axle, an electric motor centrally positioned on said resiliently supported bolster and depending therefrom and a short flexible driving connection between the motor and said axle.

8. A wheel truck provided with a pair of wheel driving axles, a bolster resiliently supported from said axle to cushion the same, a motor supported from said bolster, and positioned in the space between the axles, a longitudinally extending driving connection between said motor and each of said axles, said connection including longitudinally movable driving elements disposed between the motor and each axle whereby the motor is free to move with the bolster toward either axle without affecting the driving connection between the motor and the axles.

9. In a wheel truck, a casting constituting a bolster provided with a king pin socket, and provided with an electric motor casing formed integrally therewith and positioned below the socket, said casing provided with cores on the inner side thereof.

10. In a wheel truck, a casting constituting a bolster provided with a king pin socket, and provided with an electric motor casing formed integrally therewith and positioned below the socket, an electric motor mounted in said casing, the lower end of the socket opening into the motor casing thereby to permit the lower end of the king pin to project into the vacant space in the motor casing exteriorly of the motor.

11. In a wheel truck, a casting comprising a bolster including a vertically disposed member extending transversely of the truck and an electric motor including a cylindrical casing formed integrally with said vertically disposed bolster member.

12. In a wheel truck, a bolster element substantially truss shaped in side elevation, a portion of said bolster at the apex of the truss having a configuration and including a pair of cores designed to constitute part of an electric motor for driving the wheels of the truck.

13. In a device of the class described, the combination of a live axle, a gear connected to the axle to drive the same, a casing for housing the gear loosely supported from the axle, resilient means for holding the gear casing against rotation, a pinion journaled in said casing and in driving engagement with said gear and means supported resiliently by said resilient means for driving the pinion.

14. In a device of the class described, the combination of a truck frame resiliently supported from a live axle, a gear fixed to said axle to drive the same, a pinion journaling means, a pinion carried by said means and in driving engagement with said gear and a spring suspension for said pinion journaling means hung from the resiliently supported truck frame.

15. In a device of the class described, the combination of a truck frame resiliently supported from a live axle, a gear fixed to said axle to drive the same, a pinion journaling means, a pinion carried by said means and in driving engagement with said gear, a spring suspension for said pinion journaling means, a motor carried by said resiliently supported frame and a flexible driving engagement between said motor and said pinion.

16. In a wheel truck, the combination with a live axle, a driving gear fixed to the axle, a bolster element resiliently supported from the axle, a motor carried by the bolster element, a pinion meshing with said gear and having a slight freedom of motion about the axis of the axle, resiliently supported means for holding the pinion in position, and a flexible driving connection between the motor and the pinion.

This specification signed this 20th day of May, 1918.

HOWARD J. MURRAY.
WALTER S. RUGG.